(12) United States Patent
Tanabe et al.

(10) Patent No.: US 8,235,472 B2
(45) Date of Patent: Aug. 7, 2012

(54) BRAKING SYSTEM FOR MOTORCYCLE

(75) Inventors: Gen Tanabe, Saitama (JP); Noriyuki Muto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 738 days.

(21) Appl. No.: 12/378,836

(22) Filed: Feb. 20, 2009

(65) Prior Publication Data

US 2009/0242725 A1 Oct. 1, 2009

(30) Foreign Application Priority Data

Mar. 31, 2008 (JP) ................................. 2008-092855

(51) Int. Cl.
*B60T 8/36* (2006.01)

(52) U.S. Cl. .............................. 303/119.3; 303/DIG. 10

(58) Field of Classification Search .... 188/73.35–73.37, 188/265, 158, 162, 72.1, 106 P; 303/119.1–119.3, 303/DIG. 10
See application file for complete search history.

(56) References Cited

U.S. PATENT DOCUMENTS

| | | | |
|---|---|---|---|
| 4,500,101 A * | 2/1985 | Aoki | 280/152.1 |
| 7,350,881 B2 * | 4/2008 | Asahi | 303/137 |
| 7,661,502 B2 * | 2/2010 | Miki et al. | 180/219 |
| 7,669,680 B2 * | 3/2010 | Hasegawa | 180/219 |
| 2007/0145227 A1 * | 6/2007 | Hasegawa | 248/637 |
| 2007/0252430 A1 * | 11/2007 | Nishikawa et al. | 303/113.4 |

FOREIGN PATENT DOCUMENTS

| | | |
|---|---|---|
| EP | 1 803 637 A1 | 7/2007 |
| EP | 1 847 430 A1 | 10/2007 |
| JP | 63-017662 B2 | 4/1988 |
| JP | 02-011448 B2 | 1/1990 |
| JP | 07-88158 | 9/1995 |

* cited by examiner

*Primary Examiner* — Bradley King
*Assistant Examiner* — Vishal Sahni
(74) *Attorney, Agent, or Firm* — Carrier Blackman & Associates, P.C.; William D. Blackman; Joseph P. Carrier

(57) ABSTRACT

A braking system for a motorcycle includes a pressure regulating unit interposed between hydraulic pressure generating unit and a wheel brake, a control unit which controls operation of the pressure regulating unit so as to regulate hydraulic pressure outputted from the hydraulic pressure generating unit and exert the regulated pressure on the wheel brake, a support fixing the pressure regulating unit to an engine body mounted on a body frame of the motorcycle, and an elastic member disposed between the support and the pressure regulating unit for reducing or preventing vibration of the engine body being transmitted to the pressure regulating unit.

16 Claims, 9 Drawing Sheets

BRAKING SYSTEM FOR MOTORCYCLE

CROSS-REFERENCE TO RELATED APPLICATIONS

The present invention claims priority under 35 USC 119 based on Japanese patent application No. 2008-092855, filed on Mar. 31, 2008. The entire subject matter of this priority document, including specification claims and drawings, is incorporated by reference herein.

BACKGROUND OF THE INVENTION

1. Field of the Invention

The present invention relates to a braking system for a motorcycle, including an operation quantity detector for detecting an operation quantity of a brake operating member, a liquid/hydraulic pressure generating unit for generating hydraulic pressure independently of operation of the brake operating member, a pressure regulating unit interposed between the hydraulic pressure generating unit and a wheel brake to regulate the hydraulic pressure outputted from the hydraulic pressure generating unit and apply the regulated hydraulic pressure to the wheel brake, and a control unit for controlling the operation of the pressure regulating unit based on a detection value provided from the operation quantity detector.

2. Description of the Background Art

Braking systems for a motorcycle are known, such as those disclosed in the Japanese Patent Publication Nos. Sho 63-17662 and Hei 7-88158, in which a pressure regulating unit is mounted to a body frame at a position behind an engine mounted on the motorcycle.

In the braking systems disclosed in the above-referenced Patent Publications, it is unavoidable that some influence of vibration of the engine mounted on the body frame is exerted on the pressure regulating unit, and in order to control the hydraulic pressure in the wheel brake more accurately it is necessary to minimize or eliminate the influence of vibration of the engine on the pressure regulating unit.

The present invention has been accomplished in view of the above-mentioned problem and it is an object of the invention to provide a braking system for a motorcycle capable of surely preventing vibrations of the engine from being exerted on the pressure regulating unit.

SUMMARY OF THE INVENTION

For achieving the above-mentioned object and other objects, according to a first aspect and feature of the present invention there is provided a braking system for a motorcycle, including an operation quantity detector for detecting an operation quantity of a brake operating member, a hydraulic pressure generating unit capable of generating hydraulic pressure independently of operation of the brake operating member, a pressure regulating unit interposed between the hydraulic pressure generating unit and a wheel brake to regulate the hydraulic pressure outputted from the hydraulic pressure generating unit and to apply the regulated hydraulic pressure to the wheel brake, a control unit for controlling the operation of the pressure regulating unit based on a detection value provided from the operation quantity detector, a support fixing the pressure regulating unit to an engine body mounted on a body frame of the motorcycle, and an elastic member disposed between the support and the pressure regulating unit for reducing or preventing vibrations of the engine body being transmitted to the pressure regulating unit.

According to a second aspect and feature of the present invention, in addition to the first aspect and feature, the braking system further comprises at least one fastener which connects the support to the engine body commonly together with a cover member covering one side of the engine body.

According to a third aspect and feature of the present invention, in addition to either of the first and second aspects and features, the braking system further comprises a holding case which holds the pressure regulating unit, the holding case is supported by the support through the elastic member and is further supported by the engine body through another elastic member.

In a non-limiting, exemplary embodiment to be described herein, a brake lever 15 corresponds to the brake operating member defined in the present invention, a hydraulic pressure generating unit 17F for a front wheel corresponds to the hydraulic pressure generating unit defined in the present invention, a pressure regulating unit 18F for a front wheel corresponds to the pressure regulating unit defined in the present invention, a first pressure sensor 34 corresponds to the operation quantity detector defined in the present invention, bolts 88 correspond to the at least one fastener defined in the present invention, a lower support member 89 and an upper support member 90 correspond to the support defined in the present invention, rubber mounts 93 correspond to the elastic members defined in the present invention, and a front wheel brake BF corresponds to the wheel brake defined in the present invention.

EFFECTS OF THE INVENTION

According to the first aspect and feature of invention, since the pressure regulating unit is supported by a support fixed to the engine body with an elastic member disposed between the support and the pressure regulating unit, it is possible to reduce/prevent the transfer of vibrations from the engine body to the pressure regulating unit.

According to the second aspect and feature of the invention, since the support member is fixed to the engine body using at least one fastener which also commonly fixes a cover member to one side of the engine body, the number of additional parts used for securing the pressure regulating unit can be reduced.

According to the third aspect and feature of the invention, since a holding case for holding the pressure regulating unit is supported by the support through the elastic member and is further supported by the engine body through another elastic member, the pressure regulating unit can be positively supported positively by the engine body in a manner which surely reduces or prevents transfer of the engine body vibrations to the pressure regulating unit.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A non-limiting, exemplary embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An embodiment of the present invention will be described below with reference to the accompanying drawings.

Figure 1:
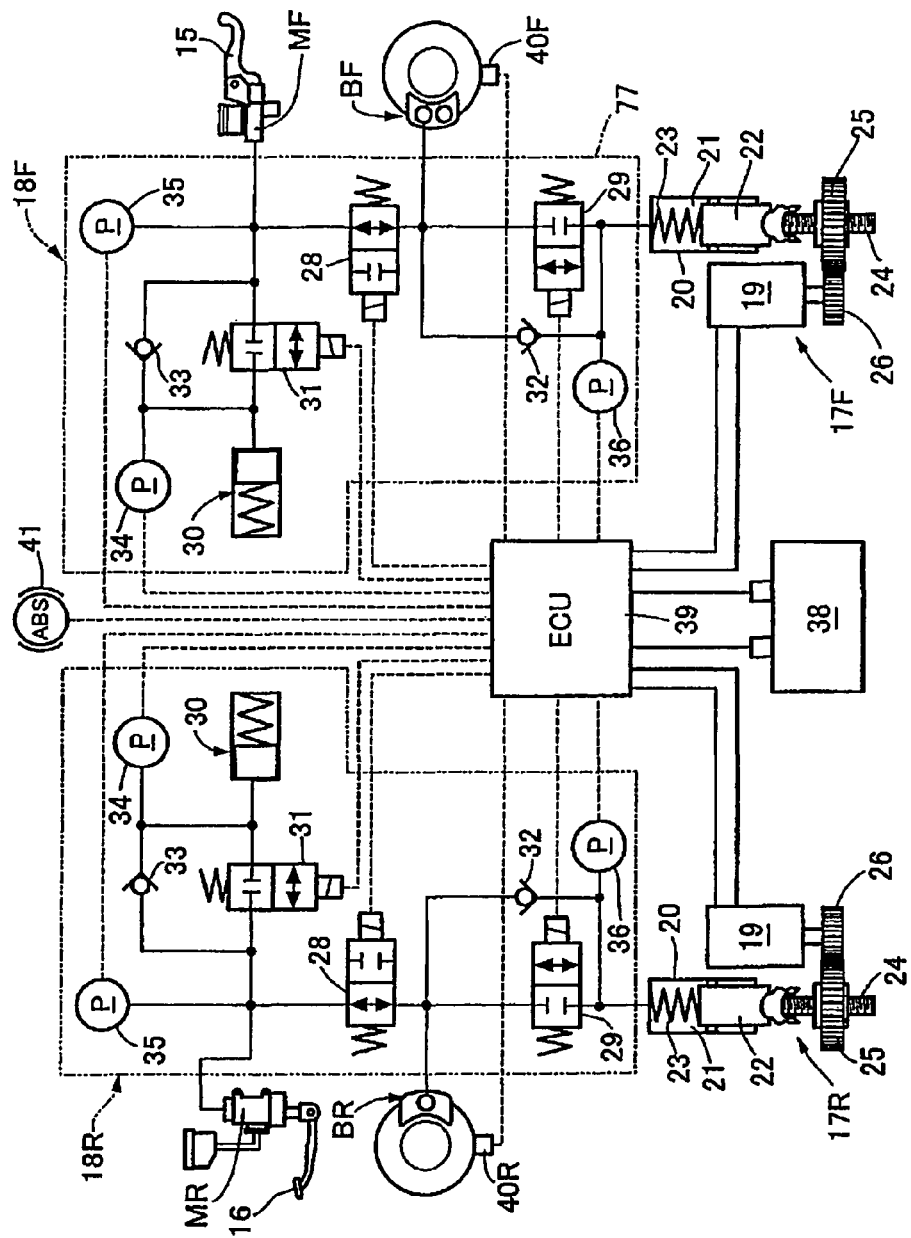
FIG. 1 is a schematic illustration of the construction of a braking system for a motorcycle according to a non-limiting exemplary embodiment of the present invention.

In FIG. 1, Hydraulic pressure which is outputted from a master cylinder MF for a front wheel in accordance with operation of a brake lever 15, as a brake operating member, can be exerted on a front wheel brake BF provided in a motorcycle and hydraulic pressure outputted from hydraulic pressure generating unit 17F for the front wheel can also be exerted on the front wheel brake BF. A pressure regulating unit 18F for the front wheel is interposed between the master cylinder MF for the front wheel, as well as the hydraulic pressure generating unit 17F for the front wheel, and the front wheel brake BF. Hydraulic pressure which is outputted from a master cylinder MR for a rear wheel in accordance with operation of a brake pedal 16, as a brake operating member, can be exerted on a rear wheel brake BR and hydraulic pressure outputted from hydraulic pressure generating unit 17R for the rear wheel can also be exerted on the rear wheel brake BR. A pressure regulating unit 18R for the rear wheel is interposed between the master cylinder MR for the rear wheel, as well as the hydraulic pressure generating unit 17R for the rear wheel, and the rear wheel brake BR.

The hydraulic pressure generating unit 17 for the front wheel is for generating hydraulic pressure under operation of an electric motor 19 and it includes the electric motor 19, a piston 22 fitted slidably into a cylindrical body 20 and forming a hydraulic pressure chamber 21 between the piston 22 and the cylindrical body 20, a return spring 23 installed in a compressed state between the cylindrical body 20 and the piston 22 so as to urge the piston 22 in a volume increasing direction of the hydraulic pressure chamber 21, a pressing shaft 24 coaxially connected with the piston 22 from the side opposite to the hydraulic pressure chamber 21, and a gear mechanism 26 connected to an output shaft of the electric motor 19. The gear mechanism 26 has a gear 25 which is threadedly engaged with the pressing shaft 24 coaxially through a ball screw (not shown). Hydraulic pressure which varies according to operation of the electric motor 19 can be outputted from the hydraulic pressure chamber 21.

The hydraulic pressure generating unit 17R for the rear wheel is constituted like the hydraulic pressure generating unit 17F for the front wheel described above. Therefore, the portions corresponding to the components of the hydraulic pressure generating unit 17F for the front wheel are identified by the same reference numerals in the drawings, and redundant detailed explanations thereof will be omitted.

The pressure regulating unit 18F for the front wheel includes a first electromagnetic opening/closing valve 28 for switching communication and cut-off from one to the other between the master cylinder MF for the front wheel and the front wheel brake BF, a second electromagnetic opening/closing valve 29 for switching communication and cut-off from one to the other between the hydraulic pressure generating unit 17F for the front wheel and the front wheel brake BF, a stroke simulator 30 which causes a pseudo reaction force proportional to an operation quantity of the brake lever 15 to be exerted on the master cylinder MF for the front wheel when the first electromagnetic opening/closing valves 28 closes, a third electromagnetic opening/closing valve 31 for switching communication and cut-off from one to the other between the stroke simulator 30 and the master cylinder MF for the front wheel, a one-way valve 32 which is connected in parallel with the second electromagnetic opening/closing valve 29 so as to permit the flow of brake fluid from the hydraulic pressure generating unit 17F for the front wheel toward the front wheel brake BF, and a second one-way valve 33 which is connected in parallel with the third electromagnetic opening/closing valve 31 so as to permit the flow of brake fluid from the stroke simulator 30 toward the front wheel brake BF. The pressure of the stroke simulator 30 is detected by a first pressure sensor 34 as operation quantity detector, the hydraulic pressure outputted from the master cylinder MF for the front wheel is detected by a second pressure sensor 35, and the hydraulic pressure outputted from the hydraulic pressure generating unit 17F for the front wheel is detected by a third pressure sensor 36.

The first pressure sensor 34 detects the hydraulic pressure outputted from the master cylinder MF for the front wheel when the first electromagnetic opening/closing valve 28 closes, thereby obtaining an operation quantity of the brake lever 15. The second pressure sensor 35, which is for fail safe diagnosis of faulty conditions, determines that a faulty condition occurs when a difference of not smaller than a predetermined value exists between the pressure detected by the second pressure sensor 35 and the value detected by the first pressure sensor 34. The value detected by the third pressure sensor 36 is used in a hydraulic pressure feedback control which controls the hydraulic pressure outputted from the hydraulic pressure generating unit 17F for the front wheel based on the value detected by the first pressure sensor 34.

The first electromagnetic opening/closing valve 28 is a normally open type electromagnetic valve, while the second and third electromagnetic opening/closing valves 29, 31 are normally closed type electromagnetic valves. The opening/closing operations of the first to third electromagnetic opening/closing valves 28, 29, 31 and the operation of the electric motor 19 in the hydraulic pressure generating unit 17F for the front wheel are controlled by a control unit 39 to which a battery 38 is connected. A detection value provided from a front wheel speed sensor 40F and detection values provided from the first to third pressure sensors 34, 35, 36 are inputted to the control unit 39, and based on these inputted values the control unit 39 controls the opening/closing operations of the first to third electromagnetic opening/closing valves 28, 29, 31 and the operation of the electric motor 19. A warning lamp 41 is connected to the control unit 39.

With ignition ON of the motorcycle, the first electromagnetic opening/closing valve 28 is open, the second and third electromagnetic opening/closing valves 29, 31 are closed, the electric motor 19 is OFF, and the warning lamp 41 is ON. In this state, if the brake lever 15 is operated and hydraulic pressure is outputted from the master cylinder MF for the front wheel, whereupon the hydraulic pressure acts on the front wheel brake BF through the first electromagnetic opening/closing valve 28.

When the motorcycle starts running, the control unit 39 makes initial diagnosis, and when it is determined that the system is in normal operation, the warning lamp 41 goes OFF. After the start of running of the motorcycle, the system assumes a stand-by state, the third electromagnetic opening/closing valve opens, and the master cylinder MF for the front wheel comes into communication with the stroke simulator 30.

When the brake pedal 15 is operated during the aforesaid stand-by state and the first pressure sensor 34 detects a hydraulic pressure of not lower than a predetermined pressure, the control unit 39 controls the first electromagnetic opening/closing valve 28 to close, controls the second electromagnetic opening/closing valve 29 to open, and turns ON the electric motor 19 in the hydraulic pressure generating unit 17F for the front wheel, further. The control unit also controls the hydraulic pressure outputted from the hydraulic pressure generating unit 17F for the front wheel so that the outputted hydraulic pressure detected by the third pressure sensor 36 becomes the pressure corresponding to the value detected by the first pressure sensor 34. As a result, the hydraulic pressure which is outputted from the hydraulic pressure generating unit 17F for the front wheel in proportion to an operation load on the brake lever 15 is exerted on the front wheel brake BF.

The pressure regulating unit 18R for the rear wheel is constituted like the pressure regulating unit 18F for the front wheel described above. Therefore, the portions corresponding to the components of the pressure regulating unit 18F for the front wheel are identified by the same reference numerals in the drawings and detailed explanations thereof will be omitted. In controlling hydraulic pressure by the pressure regulating unit 18R for the rear wheel, the control unit 39 uses a value detected by a rear wheel speed sensor 40R instead of the value detected by the front wheel speed sensor 40F which was used in the hydraulic pressure control effected by the pressure regulating unit 18F for the front wheel.

The control unit 39 can make a front/rear wheel braking force distribution control such that not only a hydraulic pressure control responsive to operation of the brake lever 15 is performed by the pressure regulating unit 18F for the front wheel, but also there is performed a hydraulic pressure control by the pressure regulating unit 18R for the rear wheel, thereby operating the front and rear wheel brakes BF, BR so as to impart distributed braking forces to the front and rear wheels, respectively. Conversely, the control unit 39 can also make a front/rear wheel braking force distribution control such that not only a hydraulic pressure control responsive to operation of the brake pedal 16 is performed by the pressure regulating unit 18R for the rear wheel, but also there is performed a hydraulic pressure control by the pressure regulating unit 18F for the front wheel, thereby operating the front and rear wheel brakes BF, BR so as to impart distributed braking forces to the front and rear wheels, respectively.

Figure 2:
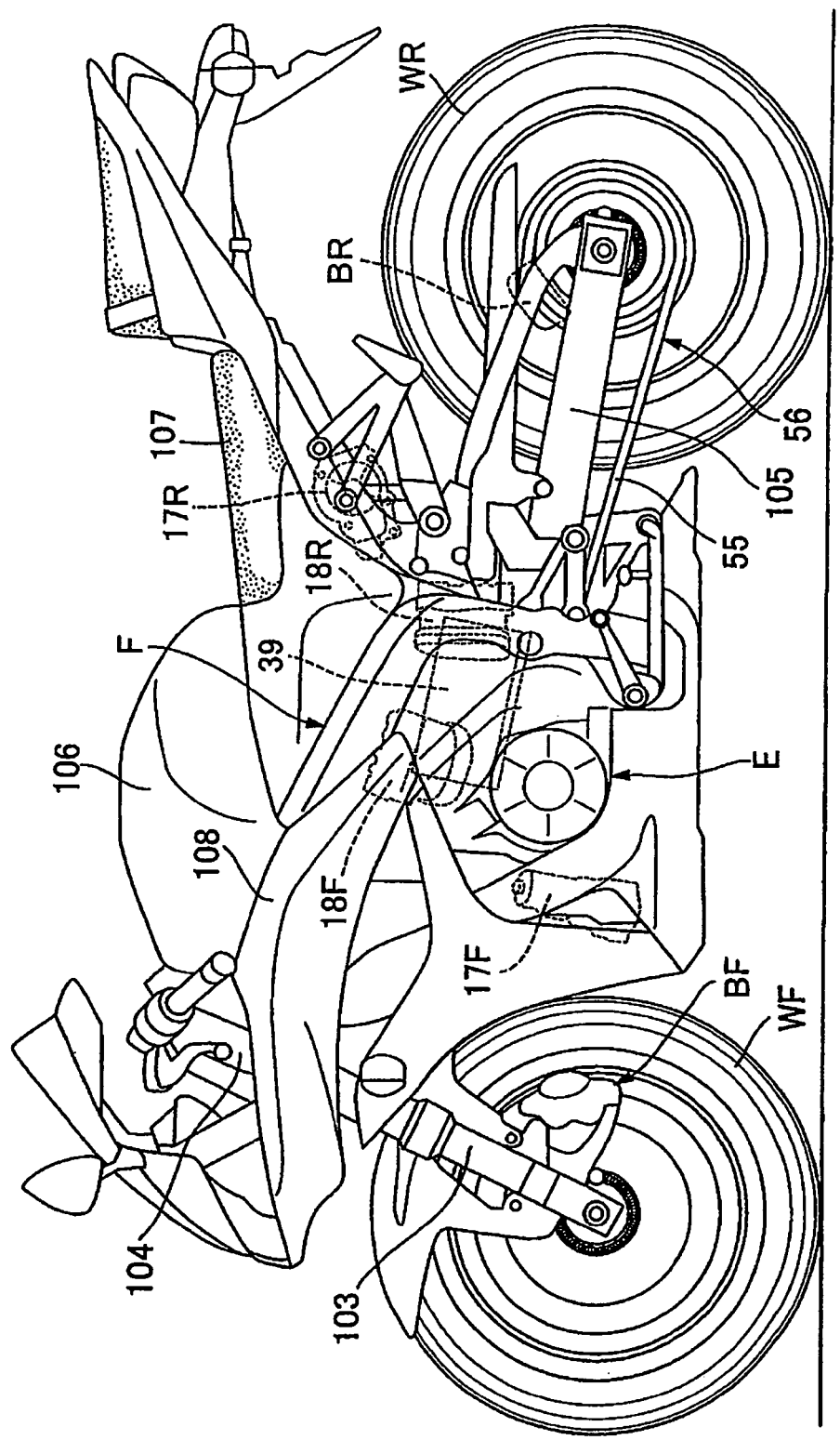
FIG. 2 is a left side view of a motorcycle having the braking system according to a non-limiting exemplary embodiment of the present invention.

In FIG. 2, a body frame F of the motorcycle has at a front end thereof a head pipe 104 which supports a front fork 103 steerably, the front fork 103 supporting a front wheel WF through an axle, with the front wheel brake BF being attached to the front wheel WF. A rear wheel WR with the rear wheel brake BR attached thereto is supported through an axle by a rear end portion of a swing arm 105, a front end portion of the swing arm 105 being supported vertically swingably by the body frame F. An engine body 51 of an engine E which produces power for rotating the rear wheel WR is mounted on the body frame F at a position between the front wheel WF and the rear wheel WR. A fuel tank 106 is mounted on the body frame F at a position above the engine E and a rider's seat 107 is supported on the body frame F at a position behind the fuel tank 106. A part of the body frame F and the engine E are covered with a front cowl 108 made of synthetic resin.

Figure 3:
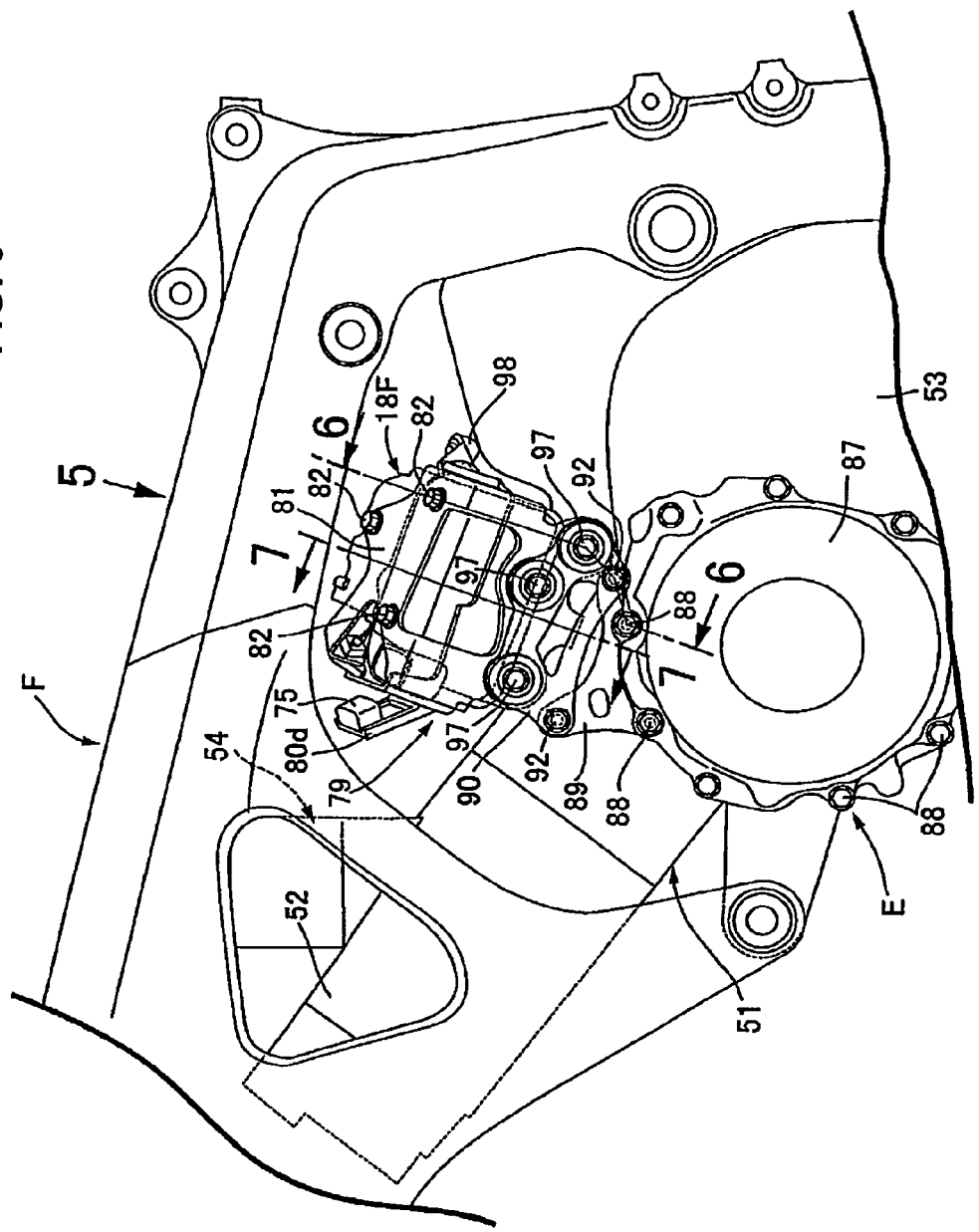
FIG. 3 is an enlarged side view of a portion of the motorcycle showing how a pressure regulating unit for a front wheel is supported by an engine body according to a non-limiting exemplary embodiment of the present invention.

In FIG. 3, the engine E is, for example, an in-line (straight) four-cylinder engine and the engine body 51 thereof is mounted on the body frame F in an attitude such that the cylinder axis is inclined in a forwardly upward direction. Further, an upwardly extending intake device 54 is connected to a rear surface of the cylinder head 52. Output of a transmission (not shown) built in a crank case 53 of the engine body 51 is transmitted to the rear wheel WR via chain drive 56 having an endless chain 55, as shown in the drawing.

In this motorcycle, the hydraulic pressure generating unit 17F for the front wheel, the pressure regulating unit 18F for the front wheel, the hydraulic pressure generating unit 17R for the rear wheel, the pressure regulating unit 18R for the rear wheel and the control unit 39 are disposed near the engine E, namely, near the center of the vehicle body.

Figure 4:
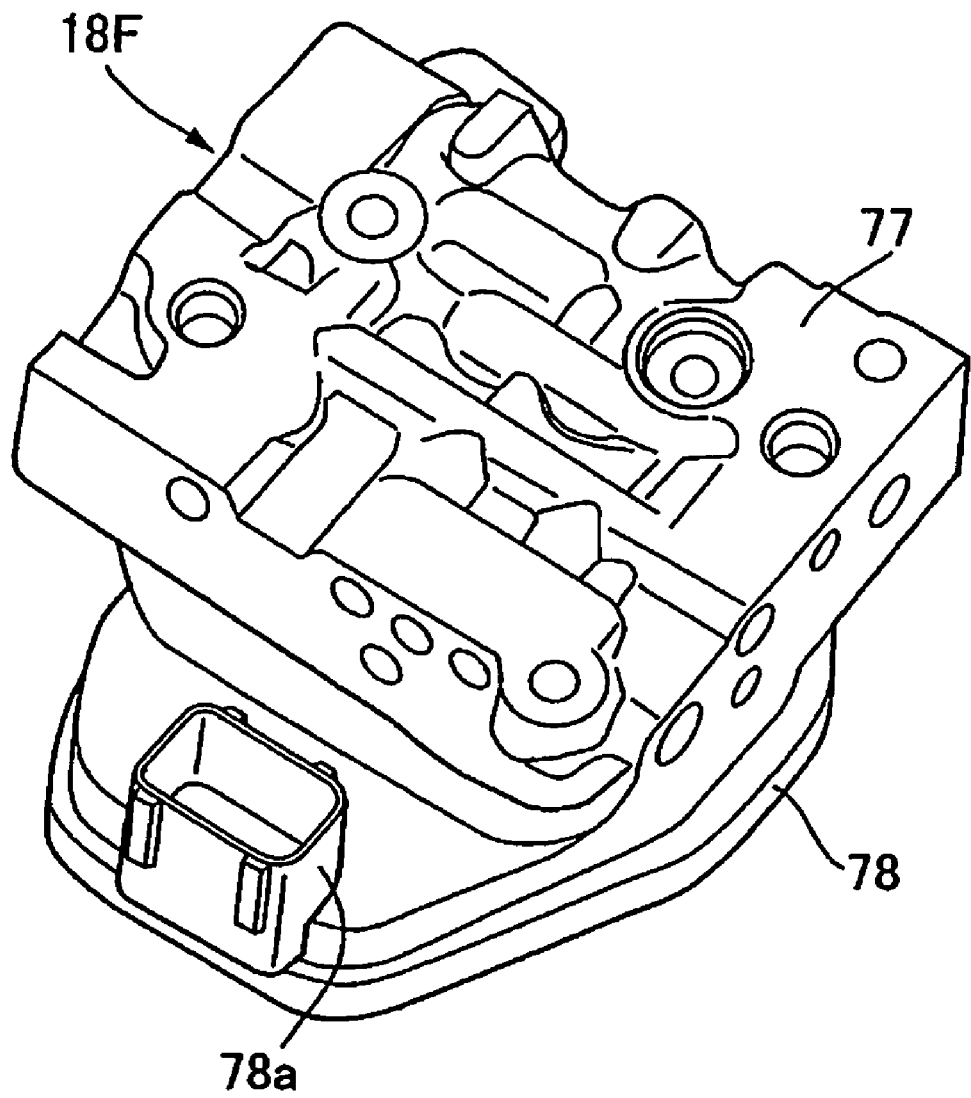
FIG. 4 is a perspective view of the pressure regulating unit for a front wheel according to a non-limiting exemplary embodiment of the present invention.
Figure 5:
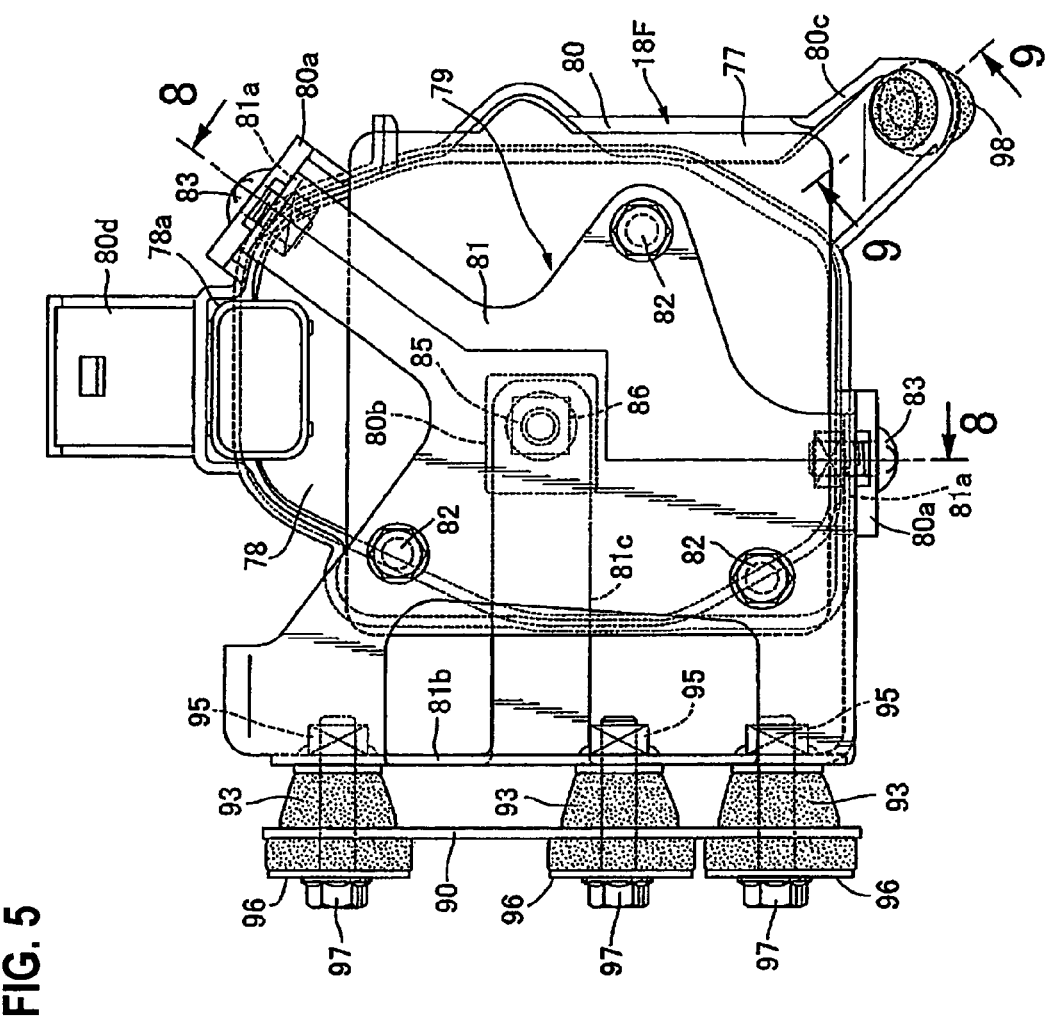
FIG. 5 is a view in the direction of arrow 5 in FIG. 3 showing the pressure regulating unit for a front wheel and a holding case for the pressure regulating unit according to a non-limiting exemplary embodiment of the present invention.
Figure 6:
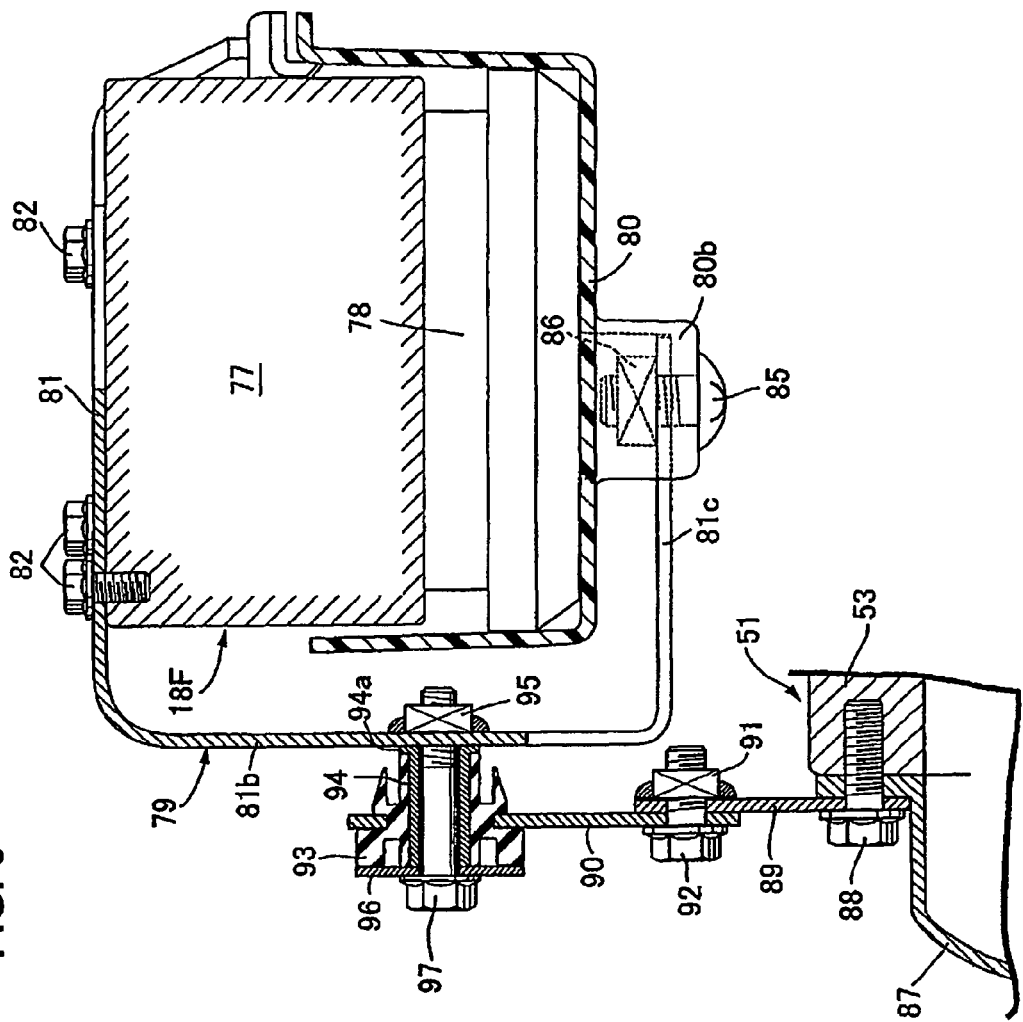
FIG. 6 is a sectional view taken on line 6-6 in FIG. 3.
Figure 7:
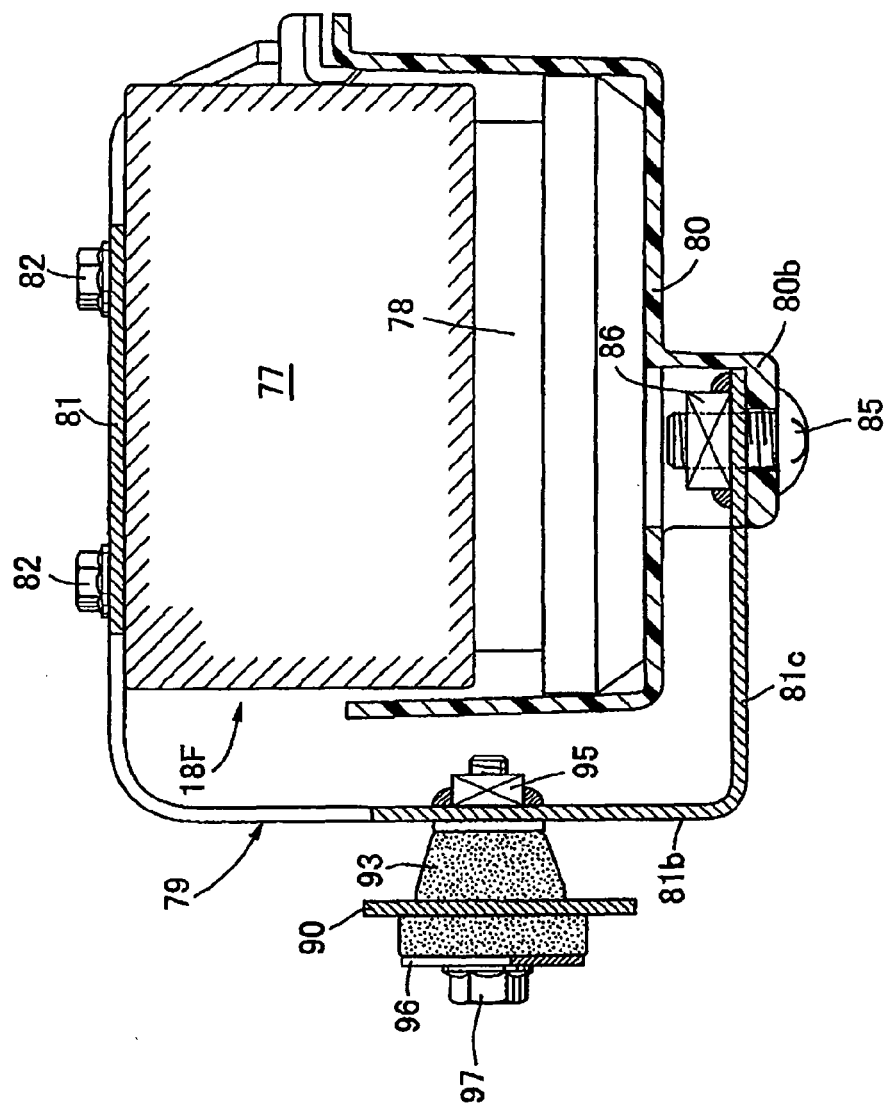
FIG. 7 is a sectional view taken on line 7-7 in FIG. 3.
Figure 8:
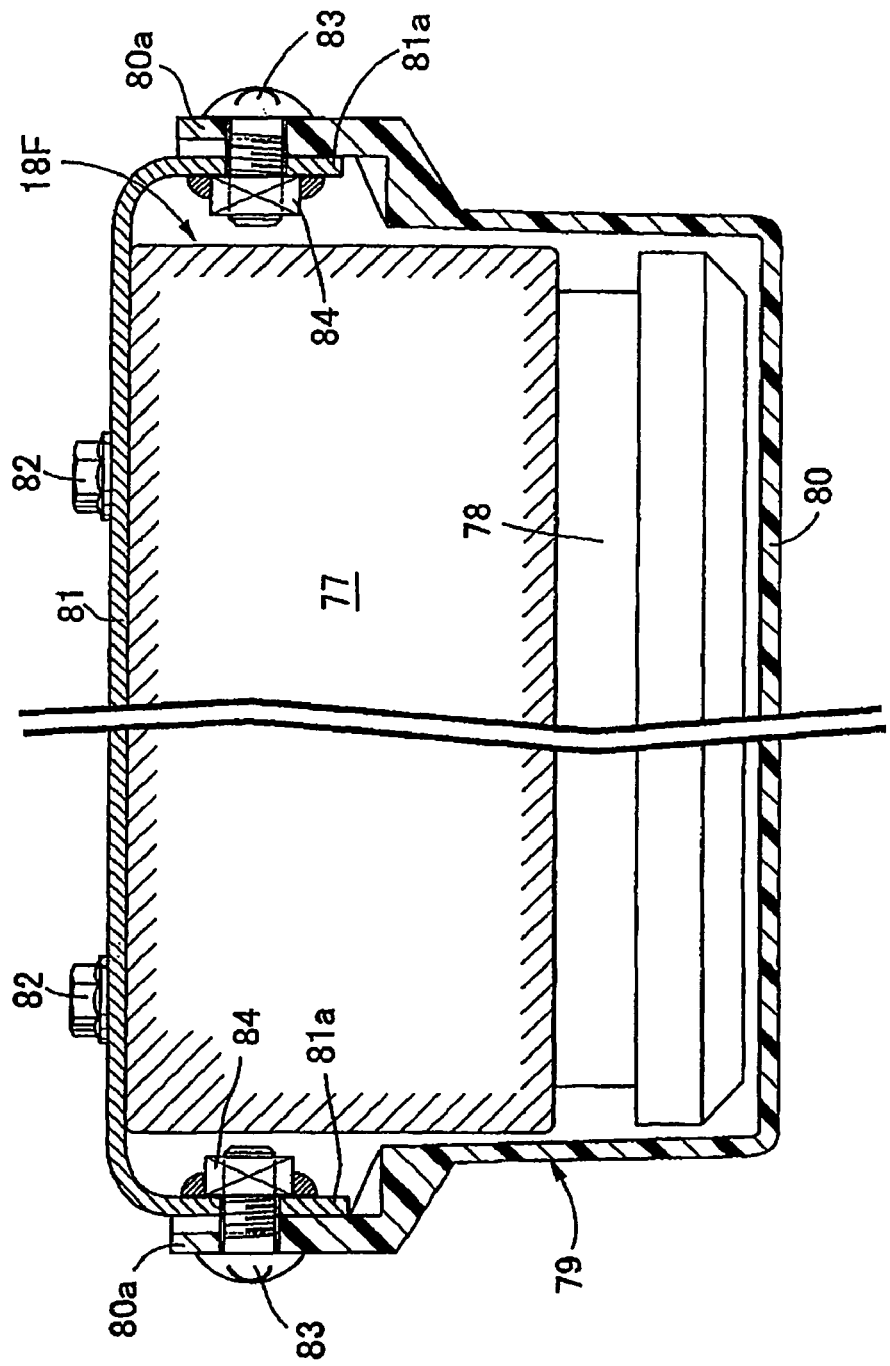
FIG. 8 is a sectional view taken on line 8-8 in FIG. 5.

As shown in FIG. 4, the pressure regulating unit 18F for the front wheel includes a base member 77 which may be formed in the shape of a rectangular parallelepiped by, for example, casting of a light metal such as aluminum alloy and a synthetic resin cover 78 integrally provided with a coupler portion 78a and attached to the base member 77. The first electromagnetic opening/closing valve 28, the second electromagnetic opening/closing valve 29, the stroke simulator 30, the third electromagnetic opening/closing valve 31, the first one-way valve 32 and the second one-way valve 33, which constitute the pressure regulating unit 18F for the front wheel, are disposed in the base member 77. Projecting portions of the first, second and third electromagnetic opening/closing valves 28, 29, 31, as well as projecting portions of the first and second one-way valves 32, 33, projecting from the base member 77 are covered with the cover 78. The first to third pressure sensors 34 to 36 are also disposed in the base member 77 and projecting portions of the first to third pressure sensors 34 to 36 from the base member 77 are also covered with the cover 78. The pressure regulating unit 18R for the rear wheel is also constituted like the pressure regulating unit 18F for the front wheel.

Of the hydraulic pressure generating unit 17F for the front wheel, the pressure regulating unit 18F for the front wheel, the hydraulic pressure generating unit 17R for the rear wheel, the pressure regulating unit 18R for the rear wheel, and the control unit 39, the pressure regulating unit 18F for the front wheel is disposed in the motorcycle in accordance with the present invention. Now, with reference to FIGS. 5 to 9, a description will be given below about a layout structure of the pressure regulating unit 18F for the front wheel in the motorcycle.

In FIGS. 5 to 8, the pressure regulating unit 18F for the front wheel is disposed between the fuel tank 106 and the crank case 53 at a position behind the cylinder 52 of the engine body 51 mounted on the body frame F. The pressure regulating unit 18F for the front wheel is held by a holding case 79 which is supported flexibly by the engine body 51.

The holding case 79 is made up of lower and upper cases 80, 81 which hold the pressure regulating unit 18F for the front wheel from above and below in an attitude with the base member 77 positioned up. The lower case member 80 may be made of synthetic resin, while the upper case member may be made of metal.

The lower case member 80 is formed in a box shape which is open upward so that the cover 78 of the pressure regulating unit 18F for the front wheel is fitted therein. The upper case member 81 is fixed with bolts 82, 82, 82 to the base member 77 of the pressure regulating unit 18F for the front wheel at plural positions, for example, three positions. At two front and rear positions of the upper case member 81 there are integrally provided connecting arm portions 81a, 81a which extend sideways of both front and rear portions of the pressure regulating unit 18F for the front wheel toward the lower case member 80. On the other hand, the lower case member 80 is integrally provided with a pair of connecting arm portions 80a, 80a which extend toward the upper case member 81 so as to be superimposed, e.g., from the outside, onto both connecting arm portions 81a . . . Screw members 83, 83 inserted through the connecting arm portions 80a . . . and 81a . . . are threadedly engaged with weld nuts 84, 84 fixed to the connecting arm portions 81a . . . of the upper case member 81. As used herein, the symbol " . . . " is used to indicate that an abbreviated discussion of the associated components is being provided, because persons of ordinary skill in the art ordinary skill in the art would understand how the components are to be joined together.

The upper case member 81 is integrally provided with a support plate portion 81b which extends downward along the left side of the pressure regulating unit 18F for the front wheel, and a connecting plate portion 81c extending downward of the lower case 80 is connected at right angles to a lower end of the support plate portion 81b. On the other hand, on the underside of the lower case member 80 there is integrally provided a box-like connecting portion 80b which is open to the left side so as to accommodate therein a front end of the connecting plate portion 81c. A screw member 85 inserted through both connecting portion 80b and connecting plate portion 81c is threadedly engaged with a weld nut 86 fixed to the front end of the connecting plate portion 81c.

A cover member 87, e.g., a generating unit cover, is clamped with plural bolts 88, 88 . . . to the left side face of the crank case 53 in the engine body 51. According to the present invention, using some of the bolts 88, 88 . . . , two bolts 88, 88 in this embodiment, a lower support member 89 is fixed to the crank case 53 together with the cover member 87.

Weld nuts 91 are fixed to plural positions, for example two positions, of an upper portion of the lower support member 89. Bolts 92 . . . are inserted through both lower and upper portions of the lower support member 89 and are brought into threaded engagement with the weld nuts 91 . . . , then are tightened, whereby an upper support member 90 which extends upward from the lower support member 89 is fixed to the lower support member 89.

The support plate portion 81b of the upper case 81 of the holding case 79 is supported flexibly at plural positions, for example three positions, by the upper support member 90 through rubber mounts 93 . . . , which may also be referred to as elastic isolation members.

Thus, the rubber mounts 93, 93, 93 are mounted at three positions of the upper portion of the upper support member 90 and collars 94 . . . formed at one ends thereof with flange portions 94a projecting sideways outwards are inserted into the rubber mounts 93 . . . respectively in such a manner that the flange portions 94a . . . are put in abutment against the support plate portion 81b of the holding case 79. Further, washers 96 . . . are abutted against the other ends of the collars 94 . . . , respectively, in such a manner as to sandwich the collars 94 . . . in between the washers 96 . . . and the support plate portion 81b. Further, bolts 97 . . . are inserted through the washers 96 . . . and collars 94 . . . and are brought into threaded engagement with weld nuts 95 . . . fixed to the support plate portion 81b.

Figure 9:
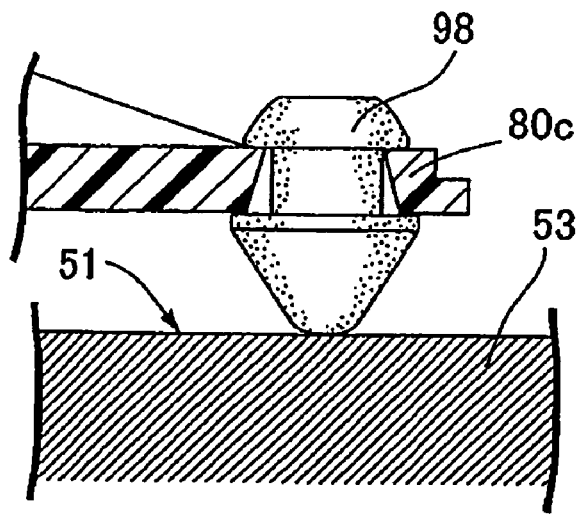
FIG. 9 is a sectional view taken on line 9-9 in FIG. 5.

Referring also to FIG. 9, the lower case member 80 is integrally formed with a support arm portion 80c extending backwards. An elastic weight-bearing member 98 is mounted at a tip of the support arm portion 80c, and is abutted against an upper surface of the crank case 53 in the engine body 51. That is, the holding case 79, which holds the pressure regulating unit 18F for the front wheel, is supported through the rubber mounts 93 . . . flexibly by the upper support member 90 fixed to the engine body 51 and is also supported by the crank case 53 in the engine body 51 through the elastic weight-bearing member 98, which rests on an external surface of the engine, as shown.

The lower case member 80 is integrally provided with a support arm portion 80d extending forward, with a wiring coupler 75 being supported by the support arm portion 80d, as shown in FIG. 3.

The operation of this embodiment will now be described. Since the pressure regulating unit 18F for the front wheel is supported through the rubber mounts 93 . . . flexibly by the lower and upper support members 89, 90 which are fixed to the engine body 51 mounted on the body frame F, it is possible to prevent the transfer of vibration from the engine E to the pressure regulating unit 18F for the front wheel.

Moreover, since the lower support member 89 is fixed to the crank case 53 in the engine body 51 together with the cover member 87 using at least one of plural bolts 88, 88 . . . which are for fixing the cover member 87 to one side of the crank case 53, it is possible to use such as least one of the bolts 88, 88 . . . as a common fastener, and thereby reduce the number of parts specially required for supporting the pressure regulating unit 18F on the motorcycle.

Further, since the pressure regulating unit 18F for the front wheel is held by the holding case 79 which is supported by the lower and upper support members 89, 90 through the rubber mounts 93 . . . and which is also supported by the crank case 53 in the engine body 51 through another elastic member 98, the pressure regulating unit 18F for the front wheel can be positively supported in a flexible manner by the engine body 51, while preventing vibration of the engine body from being transferred to the pressure regulating unit.

Thus, in the above embodiment, the lower support member 89 is fixed to the crank case 53 in the engine body 51 together with the cover member 87 using at least one of plural bolts 88, 88 . . . which are for clamping the cover member 87 to one side of the crank case 53, and the holding case 79 for holding the pressure regulating unit 18F for the front wheel is supported flexibly by the upper support member 90 which is fixed to the lower support member 89. Therefore, all that is required for maintenance of the pressure regulating unit 18F for the front wheel is to release the fixed state of the lower and upper support members 89, 90, and thus it is possible to enhance/facilitate such maintenance. Moreover, the holding case 79 may be supported through rubber mounts flexibly by the support member which is fixed to the engine body 51 commonly together with the cover member using at least one of plural fasteners which fix the cover member to one side of the engine body 51.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A braking system for a motorcycle, comprising:
   an operation quantity detector for detecting an operation quantity of a brake operating member;
   a hydraulic pressure generating unit which generates hydraulic pressure independently of operation of the brake operating member;
   a pressure regulating unit interposed between the hydraulic pressure generating unit and a wheel brake to regulate the hydraulic pressure outputted from the hydraulic pressure generating unit and apply the regulated hydraulic pressure to the wheel brake;
   a control unit for controlling the operation of the pressure regulating unit based on a detection value provided from the operation quantity detector;
   a support member fixing the pressure regulating unit to an engine body, the engine body mounted on a body frame of the motorcycle;
   a holding case which holds the pressure regulating unit therein; and
   at least one elastic isolation member disposed between the support member and the holding case for reducing vibration of the engine body transmitted to the pressure regulating unit,
   wherein the holding case is supported on the support member through the at least one elastic isolation member, and is also supported on the engine body through an elastic weight-bearing member.

2. The braking system for the motorcycle according to claim 1, further comprising at least one fastener which operatively connects the support member to the engine body, together with a cover member covering one side of the engine body.

3. The braking system for the motorcycle according to claim 1, wherein the holding case includes upper and lower case members which are joined together, the upper case member is supported by the support member through the elastic isolation member, and the lower case member is supported on the engine body through the elastic weight-bearing member.

4. The braking system for the motorcycle according to claim 3, wherein the pressure regulating unit is fitted in the lower case member and fixed to the upper case member.

5. The braking system for the motorcycle according to claim 1, wherein the elastic isolation member is disposed with a connection between the support member and the holding case, and the elastic weight-bearing member extends downwardly from the holding case to engage a surface of the engine body.

6. The braking system for the motorcycle according to claim 2, wherein the support member includes an upper member connected to the holding case with the elastic isolation member disposed therebetween, and a lower member which is connected to the engine body with said at least one fastener and is connected to the upper member with another fastener.

7. The braking system for the motorcycle according to claim 1, wherein the elastic weight-bearing member rests on an external surface of the engine body.

8. The braking system for the motorcycle according to claim 1, comprising a plurality of elastic isolation members separately disposed between the support member and the pressure regulating unit for reducing vibration of the engine body being transmitted to the pressure regulating unit.

9. The braking system for the motorcycle according to claim 2, wherein the support member includes an upper member connected to the pressure regulating unit with the elastic isolation member disposed therebetween, and a lower member which is connected to the engine body with said at least one fastener and is connected to the upper member with another fastener.

10. The motorcycle braking system according to claim 1, wherein the holding case comprises a support arm extending outwardly thereon, and wherein the weight-bearing elastic member is operatively attached to a distal portion of the support arm, and rests on an external surface of the engine body.

11. The motorcycle braking system according to claim 3, wherein the upper case member of the holding case is configured to allow a portion of the pressure regulating unit to extend outwardly therefrom.

12. A braking system for a motorcycle, comprising:
    an operation quantity detector for detecting an operation quantity applied to a brake operating member;
    a hydraulic pressure generating unit for generating hydraulic pressure separately from the brake operating member;
    a pressure regulating unit interposed between the hydraulic pressure generating unit and a wheel brake to regulate the hydraulic pressure outputted from the hydraulic pressure generating unit and apply the regulated hydraulic pressure to the wheel brake;
    a control unit for controlling the operation of the pressure regulating unit based on a detection value provided from the operation quantity detector;
    a support member operatively connecting the pressure regulating unit to an engine body, the engine body mounted on a body frame of the motorcycle;
    a holding case which holds the pressure regulating unit therein, the holding case comprising upper and lower case members which are joined together; and
    a plurality of elastic isolation members disposed between the holding case and the pressure regulating unit, for reducing vibration of the engine body transmitted to the pressure regulating unit;
    wherein the holding case is supported on the support member through the elastic isolation members and is also supported on the engine body through an elastic weight-bearing member, wherein the upper case member is supported on the support member through the elastic isolation members, and wherein the lower case member is supported on the engine body through the elastic weight-bearing member.

13. The motorcycle braking system according to claim 12, wherein the elastic isolation member is disposed with a connection between the support member and the holding case, and the elastic weight-bearing member extends downwardly from the holding case to engage a surface of the engine body.

14. The motorcycle braking system according to claim 12, wherein the elastic weight-bearing member rests on an external surface of the engine body.

15. The motorcycle braking system according to claim 12, wherein the holding case comprises a support arm extending outwardly thereon, and wherein the weight-bearing elastic member is operatively attached to a distal portion of the support arm, and rests on an external surface of the engine body.

16. The motorcycle braking system according to claim 12, wherein the upper case member of the holding case is configured to allow a portion of the pressure regulating unit to extend outwardly therefrom.

* * * * *